United States Patent Office 3,259,514
Patented July 5, 1966

3,259,514
SOLID SOLUTIONS
Donald Graham Wilkinson, Manchester, England, assignor to Imperial Chemical Industries Limited, London, England, a corporation of Great Britain
No Drawing. Filed Apr. 15, 1963, Ser. No. 272,845
Claims priority, application Great Britain, Apr. 30, 1962, 16,357/62; July 31, 1962, 29,346/62
9 Claims. (Cl. 106—288)

This invention relates to solid solutions or mixed crystals in which at least one of the components is a thiachromonoacridone.

When a solid solution (or mixed crystal) is formed from two or more components the molecules of each component enter into the same crystal structure, which may be that of one of the components, or it may be a new crystal structure differing from that of any of the components. In consequence a solid solution may be differentiated from a physical mixture of the components by examination of X-ray diffraction patterns. In a physical mixture the X-ray lines of each of the components are usually distinguishable and the pattern is merely the sum of the patterns of the constituents. Solid solution formation may result in the disappearance of certain lines from the X-ray diffraction pattern of the physical mixture, and new lines may be produced. It is one of the characteristics of a solid solution that its X-ray diffraction pattern is different from the sum of the X-ray diffraction patterns of its constituents.

Thiachromono[2:3-b]acridones are described in British patent specification No. 911,206, which claims new pigments or pigmentary compositions which consist of or comprise one or more compounds of the formula

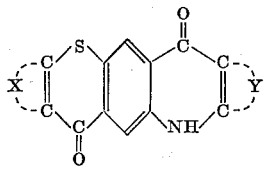

wherein X and Y each represent the atoms necessary to complete a benzene ring or a system of fused 6-, or 6- and 5-membered aromatic rings and wherein the rings or ring systems represented by X and Y may carry non-ionogenic substituents.

It has now been found that certain solid solutions or mixed crystals in which at least one of the components is a thiachromonoacridone are of great value as pigments because of their brightness of shade and excellent fastness properties, and because, in many cases, they may be manufactured more economically than the pure thiachromonoacridones previously described.

There may also be present in the solid solutions of this invention certain lin-benzobisthiachromones which are described and claimed in United Kingdom patent specification No. 851,571. Other compounds which may be present in the solid solutions of the invention are of the quinacridone series. Quinacridones are described by Liebermann in Liebig's Annalen der Chemie, volume 518 (1935) page 245.

According to the invention there are provided solid solutions having a thiachromonoacridone component of the Formula I

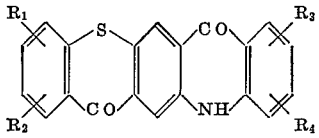

and one or more components selected from (a) Other thiachromonoacridones of the said Formula I
(b) Benzobisthiachromones of the Formula II

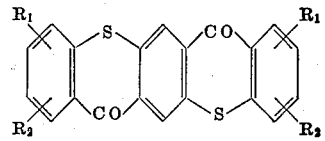

and (c) Lin-quinacridones of the Formula III

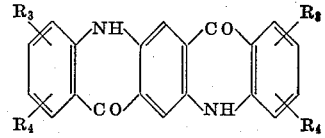

wherein $R_1$, $R_2$, $R_3$ and $R_4$, represent hydrogen atoms or nonionogenic substituents.

Substituents representable by $R_1$, $R_2$, $R_3$, and $R_4$, in the above formulae include halogen atoms, for example, chlorine or bromine, lower alkyl radicals, for example methyl or ethyl radicals and lower alkoxy radicals, for example, methoxyl or ethoxyl radicals.

According to a further feature of the invention there is provided a first process for the manufacture of solid solutions as hereinbefore defined which comprises treating a physical mixture of the components with an organic liquid.

In one embodiment of the first process of the invention a dry mixture (preferably in a finely divided form such as may, for example, be obtained by grinding, salt-milling or acid-pasting) is contacted with an organic liquid, especially an organic liquid of high dielectric constant for example pyridine, dimethylsulphoxide, N-methylpyrrolidone, phenol or dimethylformamide. The process of contacting with the organic liquid may be carried out either at an elevated temperature, for example at the boiling point of the organic liquid, or at ordinary atmospheric temperatures.

In a second embodiment of the first process of the invention an aqueous paste of the components is heated with an organic liquid at between 50° and 200° C. As organic liquid there may be used any organic substance which is liquid at the temperature of heating. Preferably the organic solvent has a boiling point above 100° C. Organic liquids found to be of especial value for use in the second embodiment of the process of the invention are dimethylformamide and especially phenol and cyclohexanone.

In carrying out this embodiment of the first process of the invention the aqueous paste is preferably stirred with sufficient organic solvent to give a stirrable mixture, and heated. It is frequently advantageous to remove water by distillation. Heating may then be continued, at between 50° and 200°, and preferably at between 100° and 200° C., for some time. If desired, the heating may be carried out under pressure in a sealed vessel. When the preferred solvents are used the process is usually complete in from 2 to 6 hours. Longer periods of heating may be necessary with other solvents. Finally the mixture may be poured into water, dilute acid or a low-boiling solvent such as methanol (the choice of diluent will depend upon the nature of the organic solvent used) and the solid solution may be filtered off, washed and dried. Alternatively the solvent may be removed by steam distillation and the solid solution may then be filtered off and dried.

According to a further feature of the invention we provide a second process for the manufacture of solid solutions as hereinbefore defined which comprises heating a neutral aqueous paste of the components under pressure at between 150° and 300° C.

The term "neutral" indicates a pH of approximately 7, for example between the limits of about 6 and 8.

The second process of the invention is carried out in an autoclave, preferably with stirring. During the heating the pigment becomes increasingly crystalline, and when solid solution formation is complete the appearance under a microscope is that of a homogeneous crystalline powder. The time taken for complete formation of a solid solution depends largely upon the starting material and the temperature of heating. After heating, the product may be filtered off, washed and dried.

Aqueous pastes for use in either the first or second process of the invention may be obtained by mixing pastes of the components, or by mixing the dry components, for example in crystalline form and subjecting the mixture to a known procedure for obtaining finely divided solids in paste form. Preferably a mixture of dry, crystalline components is dissolved in sulphuric or polyphosphoric acid, the solution is added to water and the precipitated finely divided mixture of the components is filtered off and washed free of acid with water. Alternatively a mixture of the dry crystalline components may be salt milled and the salt removed by washing with water.

The proportion of the components used in manufacture of the solid solutions of the invention are not critical. In cases where it is not possible for the whole of one or more components to enter a common crystal structure, however, the product may consist of a mixture of solid solution and residual component or components.

A mixture of components suitable for use in the manufacture of solid solutions of the invention may economically be obtained by simultaneous condensation of a dialkyl 2:5-dihalogenoterephthalate, for example diethyl 2:5-dibromoterephthalate, with one or more thiophenols and one or more formanilides followed by cyclisation of the resultant mixture. The product obtained in this way invariably contains a thiachromonoacridone and, depending on the proportions of thiophenol and formanilide used in the condensation, it may also contain benzobisthiachromones, linear quinacridones, or other thiachromonoacridones, or more than one of these compounds.

The solid solutions of the invention are valuable as pigments and may be used either alone or in admixture with other pigments for coloration purposes, for example, in paints, lacquers, enamels, printing inks and other coating compositions, in plastics such as polystyrene, polyolefines, phenol-formaldehyde resins, polyvinyl chloride, polyacrylic resins, cellulose acetates, polyesters and polyamides and in fibre-forming materials such as viscose, cellulose acetates, polyamines, polyolefines and polyesters. Orange to bluish-red shades of excellent fastness properties are obtained. The shades obtained by use of the solid solutions of the invention are frequently brighter than the shades obtainable by use of the component compounds either alone or in physical admixture. In many cases also the light fastness of the solid solutions is better than the light fastness of the physical mixture from which the solid solution is obtained.

The preferred solid solutions of the invention have one thiachromonoacridone component of the Formula I and one or two components selected from benzobisthiachromones of the Formula II and lin-quinacridones of the Formula III. Such compositions have very bright attractive shades and the mixtures of components from which they are obtained are readily accessible by simultaneous condensation of a dialkyl 2:5-dihalogenoterephthalate with a thiophenol and a formanilide, followed by hydrolysis and cyclisation.

Physical mixtures containing any desired proportions of 2:9-dichlorothiachromonoacridone and 2:9-dichlorobenzobisthiachromone and/or 2:9-dichloro-lin-quinacridone can be converted completely into solid solutions. Such solid solutions vary from yellow-orange to red in shade, according to the proportions of constituents and are extremely valuable as pigments because of their bright shades and outstanding durability on exposure to the weather.

The invention is illustrated but not limited by the following examples in which the parts are by weight.

Example 1

9 parts of 2:9-dichloro-thiachromonoacridone and 6 parts of 2:9-dichloro-lin-quinacridone are added gradually to 80 parts of concentrated sulphuric acid stirring at room temperature. The solution is added gradually with stirring to 800 parts of water at 60° to 80° C. and the precipitated mixture is filtered off and washed free from acid. The moist filter cake is mixed with 150 parts of phenol and stirred in an oil bath at 140° to 150° C. distilling off the water through a column. After heating for 2 to 3 hours the mixture is cooled, diluted with methyl alcohol and filtered. The resultant bright red solid solution is washed free from phenol and dried. The X-ray diffraction pattern of this product exhibits lines corresponding to the following interplanar spacings to Angstrom units:

Strong line: 3.20
Medium lines: 5.90, 3.81
Weak lines: 5.50, 5.4, 4.55, 4.15, 3.61 and 3.31

This is different from the sum of the diffraction patterns of 2:9-dichloro-thiachromonoacridone:

Strong line: 3.20
Medium lines: 5.9, 3.83, 3.62
Weak lines: 5.4, 4.55, 4.13, 3.79, 3.31, 3.23 and 2:9-dichloro-quinacridone:

Strong line: 3.19
Medium lines: 5.8, 5.35, 3.87, 3.80
Weak lines: 4.6, 4.16, 3.63, 3.52, 3.33, 3.07 2.89, 2.27 and 2.14

The product may be used as a pigment, and when incorporated into paints or other surface coating compositions, it gives bright bluish red shades of excellent fastness to heat, light, and solvents. It can also be used for the mass colouration of plastic materials.

Example 2

A mixture of 7.0 parts of 2:9-dichlorothiachromonoacridone and 3.0 parts of 2:9-dichlorobenzobisthiachromone is added gradually to 50 parts of concentrated sulphuric acid stirring at room temperature. The solution is then added gradually with stirring to about 800 parts of water at 60° to 80° C. The precipitated pigment is then filtered and washed free from acid. The moist filter cake is mixed with 100 parts of phenol and stirred at 150° to 160° for 5 hours, distilling off the water through a column. The suspension is then diluted with methanol and the product is filtered, washed free from phenol with methanol and dried. A bright scarlet solid solution is obtained.

The X-ray diffraction spectrum of the product exhibits lines corresponding to the following interplanar spacings in Angstrom units:

Strong lines: 3.27, 3.21
Medium lines: 6.0, 3.85
Weak lines: 8.3, 5.7, 5.5, 5.35, 4.5, 4.13, 3.75, 3.63 and 3.30

This is different from the sum of the diffraction patterns of 2:9-dichlorothiachromonoacridone (see Example 1) and 2:9-dichlorobenzobisthiachromone which exhibits the following lines:

Strong lines: 3.30, 3.28
Medium lines: 3.88, 3.63, 3.00, 2.99
Weak lines: 8.1, 6.65, 5.9, 5.45, 4.5, 4.07, 3.9, 3.71, 3.4, 3.23 and 3.20

The product may be used as a pigment and when incorporated into paints or other surface coating compositions it gives bright scarlet shades of excellent fastness properties. It may also be used for colouration of plastics.

Example 3

A mixture of 4 parts of 2-chloro-thiachromonoacridone and 1 part of lin-quinacridone is added gradually to 90 parts of concentrated sulphuric acid with stirring at room temperature. The solution is added with stirring to 500 parts of water at 60° to 80° C. and the precipitate is filtered and washed free from acid. The moist filter cake is mixed with 40 parts of phenol and stirred at 150° C. allowing the water to distill off through a column. The suspension is then cooled, diluted with methanol and the product is filtered, washed free from phenol with methanol and dried. A bright yellowish red solid solution is obtained.

The X-ray diffraction spectrum of the product exhibits a diffraction pattern with lines corresponding to the following interplanar spacings in Angstrom units:

Strong lines: 3.43, 3.39
Medium lines: 15.0, 14.0, 10.0, 6.75, 4.17, 3.81, 3.69, 3.29
Weak lines: 6.5, 6.1, 5.5, 5.0, 4.95, 4.76, 4.49, 4.28, 3.22, 3.20, 3.11, 3.05, 2.93 and 2.84

This diffraction pattern is almost identical with that of 2-chloro-thiachromonoacridone (which however has no line at 14.0), and does not show the characteristic lines of lin-quinacridone.

The product may be used as a pigment and when incorporated in paints and other surface coatings bright yellowish red shades are obtained which have excellent fastness to heat, light, solvents and exposure to the weather. It can also be used for the mass colouration of plastic materials.

If this example is repeated using 3 parts of 2-chloro-thiachromonoacridone and 2 parts of lin-quinacridone a very similar but slightly bluer red solid solution is obtained, which has the same excellent properties when used as a pigment. The X-ray diffraction pattern of this solid solution is similar to that of the previously described product but the lines at 14.0 and 6.5 are of greater intensity.

Example 4

7.0 parts of dimethyl 2:5-dibromoterephthalate, 6.5 parts of p-chloroformanilide, 2.0 parts of p-chlorothiophenol, 4.2 parts of anhydrous potassium carbonate and 0.2 part of cupric acetate dihydrate are stirred with 25 parts of dry pyridine at reflux temperature for 20 hours. A solution of 5 parts of sodium hydroxide in 40 parts of ethanol and 60 parts of water is added and the mixture is steam distilled to remove the pyridine. The liquor is filtered from tar and the yellow brown filtrate is made strongly acid with acetic acid. The precipitated red acid is filtered off, washed and dried. It can be shown by paper chromatography of the ammonium salt using n-butanol:N aqueous ammonia as the eluting medium and then developing with dilute hydrochloric acid that the product consists of 2-(p-chloroanilino)-5-(p-chlorophenylmercapto)-terephthalic acid and 2:5-bis-(p-chloroanilino)-terephthalic acid and only a minute trace of 2:5-bis-(p-chlorophenylmercapto)-terephthalic acid.

6.0 parts of the above mixed acids are added gradually to 35 parts of tetraphosphoric acid (containing 85% $P_2O_5$) stirring at 180° C. during 2 hours. Heating is continued at 180° C. for a further 2 hours. The melt is then allowed to cool, diluted by gradual addition of cold water and then poured when fluid into an excess of cold water. The precipitated red product is filtered off and washed free from acid. It is freed from alkali-soluble material by boiling with dilute sodium carbonate solution and then filtered and washed free from alkali.

The moist filter cake is mixed with 20 parts of phenol and stirred at 160° for 6 hours, distilling off the water through a column. The suspension is then diluted with methyl alcohol, and the bluish red solid solution is filtered, washed free from phenol with methyl alcohol and dried at 40° C. The X-ray diffraction pattern of this product is essentially the same as that of 2:9-dichloro-thiachromonoacridone (Example 1) and does not show the characteristic lines of 2:9-dichloroquinacridone.

The product may be used as a pigment for the coloration of paints and plastics and gives bright bluish red shades of excellent fastness.

Example 5

14 parts of dimethyl 2:5-dibromo-terephthalate, 7.4 parts of p-chloro-thiophenol, 9.2 parts of p-chloroformanilide, 8.4 parts of anhydrous potassium carbonate and 0.4 part of cupric acetate dihydrate are stirred with 50 parts of dry pyridine at reflux temperature for 20 hours, and the product is isolated by the procedure described in Example 4. 15 parts of orange mixed acids are obtained. 8 parts of the mixed acids are stirred at 100° for 4 hours with 9.9 parts of thionyl chloride and 95 parts of monochlorobenzene. The solution is then cooled down to room temperature and 7.2 parts of powdered aluminum chloride are added gradually with good stirring. The mixture is then stirred at 120 to 130° for 2 hours, allowed to cool and the insoluble aluminum chloride complex is isolated by filtration and decomposed by stirring with a mixture of water, ethanol and concentrated hydrochloric acid. The orange red product is filtered off, washed with ethanol and dried. It is dissolved in 90 parts of sulphuric acid and the solution added gradually, with stirring, to 500 parts of hot water keeping the temperature between 80° and 110° C. The precipitate is filtered off and washed free from acid. The filter cake (54 parts by weight) is mixed with 66 parts of water and heated at 200° for 3 hours in an autoclave. The suspension is then heated with dilute sulphuric acid to dissolve traces of contaminating iron from the autoclave and the solid is filtered off, washed and dried.

The microcrystalline product is a solid solution comprising 2:9-dichlorothiachromonoacridone, 2:9-dichlorobenzobisthiachromone and 2:9-dichloroquinacridone. It may be used as a pigment for the production of bright scarlet shades in paints and plastics. The X-ray diffraction spectrum is similar to that of 2:9-dichlorobenzobisthiachromone.

A very similar pigment with the same X-ray diffraction pattern is obtained if the filter cake obtained after precipitation from sulphuric acid, instead of being heated with water in an autoclave is heated with 20 parts of phenol or cyclohexanone at 150° for 6 hours, allowing the water to distil off, and the solid is isolated by diluting with methanol, filtering, washing and drying.

Example 6

A laboratory ball mill is charged with 350 parts of steel balls, 35 parts of iron nails, 20 parts of dry sodium chloride, 1.7 parts of 9-chloro-thiachromonoacridone and 0.3 part of lin-quinacridone. The mill is rotated at about 120 revolutions per minute for 48 hours. The salt-pigment mixture is separated from the balls and nails and stirred with about 30 parts of dimethylformamide for 24 hours at room temperature. The paste is diluted with water and the solid is filtered off. The wet pigment paste is then freed from traces of iron by stirring with about 300 parts of 5% sulphuric acid at between 90° and 95° for half an hour. The suspension is then filtered and washed free from acid. The wet filter cake is intimately mixed with 0.2 part of pine oil and 0.1 part of ammonia solution (density 0.88) and dried at between 40 and 50° C. A bright scarlet micro crystalline pigment is obtained. The X-ray diffraction pattern is closely similar to that of 9-chloro-thiachromonoacridone and shows

Example 7

2.5 parts of thiachromonoacridone and 2.5 parts of 2:11-dichlorothiachromonoacridone are dissolved with stirring in 50 parts of concentrated sulphuric acid. The solution is then added gradually to about 500 parts of hot water with good stirring. The precipitate is filtered off and washed until neutral. The moist filter cake is mixed with about 30 parts of phenol and stirred at 180° for 2 hours, allowing the water to distil off during the process. The mixture is cooled, diluted with ethanol and the pigment is filtered and washed free from phenol with ethanol. It is dried at 40°. An orange pigment is obtained. The X-ray diffraction pattern is different from any of the known thiachromonoacridone polymorphs and 2:11-dichloro-thiachromonoacridone. The product is thereby shown to be a solid solution of the two components.

Example 8

A mixture of 3.5 parts of 2:9-dichloro-11-methyl-thiachromonoacridone and 1.5 parts of 2:9-dichloro-quinacridone is added gradually to 50 parts of concentrated sulphuric acid, stirring at room temperature. The solution is then added rapidly to about 500 parts of hot water with good stirring. The precipitate is filtered off, and washed until free from acid. The moist filter cake is mixed with 50 parts of phenol and stirred at 150° for 3 hours, allowing the water to distil off during the process. The mixture is then diluted with ethanol, filtered and the pigment is washed free from phenol with ethanol and dried. A bright bluish red pigment is obtained.

X-ray examination shows the product to be a solid solution, since the diffraction spectrum contains none of the characteristic lines of any known crystal phases of either of the components.

In place of phenol in this example, dimethyl formamide or cyclohexanone may be used.

Example 9

3.0 parts of a mixture of 2:9-dimethoxythiachromonoacridone and 2:9-dimethoxy-benzobisthiachromone made as described below is dissolved in 30 parts of 95% sulphuric acid and the solution is added gradually to about 300 parts of hot water with good stirring. The pigment is filtered off and washed free from acid. The wet paste is mixed with 30 parts of phenol and stirred at 150° for 1 hour allowing the water to distil off. The pigment is then filtered off and the phenol washed out with ethanol. It is dried at 40°. A reddish brown pigment is obtained. The X-ray diffraction spectrum is similar to, but not quite identical with that of 2:9-dimethoxybenzobisthiachromone and shows none of the characteristic lines of the spectrum of 2:9-dimethoxy-thiachromonoacridone. The product is thus a solid solution of the two components.

The mixture used as starting material in this example is obtained as follows:

A mixture of 7.0 parts of dimethyl 2:5-dibromoterephthalate, 3.6 parts of p-methoxy-thiophenol, 4.5 parts of p-methoxyformanilide, 4.2 parts of potassium carbonate, 0.2 part of copper acetate and 25 parts of dry pyridine is stirred at the boil for 20 hours. The orange yellow mixed product (7.3 parts), consisting of a mixture of 2.5-di(p-methoxyphenylmercapto)-terephthalic acid and 2-(p-methoxyphenylmercapto)-5-(p-methoxyphenylamino)-terephthalic acid is isolated by making the liquor strongly alkaline, steam distilling off the pyridine, acidifying, filtering off the precipitate and drying. 7.2 parts of this product are cyclised by heating with 10.0 parts of thionylchloride in 90 parts of monochlorobenzene at 100° for 4 hours. The solution is cooled to room temperature, 6.9 parts of powdered aluminium chloride is slowly added with stirring, and the temperature is raised to 130° for 2 hours. The melt is poured into dilute hydrochloric acid, monochlorobenzene is removed by steam distillation and the red-brown product is filtered off and dried. The crude pigment is purified by dissolving in 36 parts of 95% sulphuric acid with good stirring, precipitating by adding slowly 7 parts of water, filtering and washing with diluted acid of the same strength. The filter cake is then added to water, boiled with excess of dilute ammonia, filtered and dried. The red brown product is a mixture of 2:9-dimethoxy-thiachromonoacridone and 2:9-dimethoxybenzobisthiachromone.

Example 10

6.2 parts of the mixture obtained as described below is dissolved with stirring in 55 parts of concentrated sulphuric acid and precipitated by adding the solution gradually to about 400 parts of hot water with good stirring. The precipitate is filtered off and washed neutral. The wet scarlet paste is made up to 120 parts by mixing with water. It is then transferred to an autoclave and heated at 200° for 10 hours. The suspension is heated with 5% of sulphuric acid for half an hour at 90° to 95° C., filtered, washed neutral and dried. The pigment so obtained, when incorporated into paints or used for the colouration of plastic materials gives extremely bright scarlet red shades of excellent fastness to solvents, heat and light and exposure to the weather. The pigment when examined by X-rays was found to be moderately crystalline, apparently a homogeneous phase and there was no evidence of the diffraction spectrum of 2:9-dichloro-quinacridone.

The X-ray diffraction pattern is similar to that of 2-chloro-9-bromothiachromonoacridone and shows none of the characteristic lines of either 2:9-dibromobenzobisthiachromone or 2:9-dichloro-lin-quinacridone.

The mixture used as starting material in this example is obtained as follows:

7 parts of dimethyl 2:5-dibromoterephthalate is reacted with 4.9 parts of p-bromothiophenol, and 4.6 parts of p-chloroformanilide by stirring and heating for 20 hours with 4.2 parts of potassium carbonate, 0.2 part of cupric acetate and 25 parts of pyridine. The mixed acids are isolated by making the liquor strongly alkaline, steam distilling off the pyridine, acidifying, filtering off the precipitate and drying. The dry product (8.2 parts) is then refluxed for 4 hours with 8.8 parts of thionyl chloride in 90 parts of monochlorobenzene, 6.5 parts of powdered aluminium chloride is added and the temperature is raised to 100° to 130° C. for 2 hours. The melt is poured into dilute hydrochloric acid, monochlorobenzene is steam distilled off and the red product is filtered off and dried. It can be purified by dissolving in 59 parts of concentrated sulphuric acid and then adding gradually 12 parts of water with good stirring. The precipitated pigment is filtered off, boiled up with dilute aqueous ammonia, washed and dried. Analysis shows the product to contain 1.7% of nitrogen and 8.0% of sulphur. It consists mainly of 2-chloro-9-bromo-thiachromonoacridone, some 2:9-dibromo-benzobisthiachromone and a little 2:9-dichloro-quinacridone.

As can be gathered from the foregoing examples, the thiachromonoacridone component (Formula I) of the solid solutions of the present invention may be present in the amount of 50 to 85% by weight of said solutions.

By the methods described in the above examples solid solutions may also be obtained containing the following constituents:

3:10-dichlorothiachromonoacridone
3:10-dichlorobenzobisthiachromone
3:10-dichloro-lin-quinacridone 4:11-dibromothiachromonoacridone
4:11-dibromobenzobisthiachromone
4:11-dibromo-lin-quinacridone 3:10-dimethylthiachromonoacridone
3:10-dimethylbenzobisthiachromone
3:10-dimethyl-lin-quinacridone 2:9-diethoxythiachromonoacridone
2:9-diethoxybenzobisthiachromone
2:9-diethoxy-lin-quinacridone 2:4:9:11-tetramethylthiachromonoacridone
2:4:9:11-tetramethylbenzobisthiachromone
2:4:9:11-tetramethyl-lin-quinacridone 2:9-dimethyl-11-bromothiachromonoacridone
2:9-dimethyl-4:11-dibromobenzobisthiachromone
2:9-dimethyl-lin-quinacridone 2-chloro-4:9-dimethylthiachromonoacridone
2:9-dimethyl-benzobisthiachromone
2:9-dichloro-4:11-methyl-lin-quinacridone The choice of solvent to be used in converting physical mixtures into solid solutions is not necessarily restricted to those whose use is described in the above examples. Even water, in which the compounds are normally considered to be quite insoluble, can successfully be used as a medium for the purpose (Examples 5 and 10). Low boiling organic solvents such as methanol, ethanol, ether, acetone and benzene necessitate the use of strong autoclaves in order to withstand the high pressures generated at the temperatures where they become effective and to avoid the use of autoclaves it is generally preferred to employ solvents of boiling point above 100° C. Solvents of high dielectric constant appear to be the most effective in promoting solid solution formation from a dry, finely divided physical mixture of the components. For forming a solid solution from an aqueous paste of the components solvents of lower dielectric constant may also be used, cyclohexanone being especially effective.

We claim:

1. Solid solutions having a thiachromonoacridone component of the formula

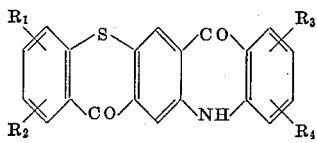

and up to 2 components selected from the class consisting of:
  (a) other thiachromonoacridones of the said formula
  (b) benzobisthiachromones of the formula

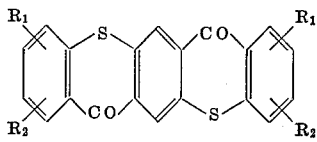

and (c) lin-quinacridones of the formula

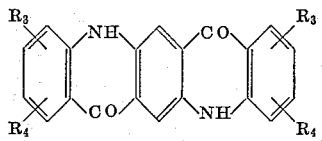

wherein $R_1$, $R_2$, $R_3$ and $R_4$ represent substituents selected from the class consisting of hydrogen, chlorine and bromine atoms and methyl, methoxyl and ethoxyl radicals, said first mentioned thiachromonoacridone being present in the amount of 50 to 85% by weight of said solutions.

2. Solid solutions consisting of 2:9-dichlorothiachromonoacridone, 2:9 - dichlorobenzobisthiachromone and 2:9-dichloro-lin-quinacridone, said 2:9-dichlorothiachromonoacridone being present in the amount of 50 to 85% by weight of said solutions.

3. Solid solutions consisting of 2:9-dichlorothiachromonoacridone and 2:9-dichloro-lin-quinacridone, said 2:9-dichlorothiachromonoacridone being present in the amount of 50 to 85% by weight of said solutions.

4. Solid solutions consisting of 2:9-dichlorothiachromonoacridone and 2:9 - dichlorobenzobisthiachromone, said 2:9-dichlorothiachromonoacridone being present in the amount of 50 to 85% by weight of said solutions.

5. Process for manufacture of the solid solutions according to claim 1 which comprises contacting a dry, finely divided mixture of the components with a liquid of high dielectric constant.

6. Process for manufacture of the solid solutions according to claim 1 which comprises contacting a dry, finely divided mixture of the components with a liquid selected from the class consisting of pyridine, dimethylformamide, dimethylsulphoxide, N-methylpyrrolidone and phenol.

7. Process for manufacture of the solid solutions accordcording to claim 1 which comprises heating at between 50° and 200° C. an aqueous paste of the components with an organic liquid of boiling point above 100°.

8. Process for manufacture of the solid solutions according to claim 1 which comprises heating at between 50° and 200° C. an aqueous paste of the components with an organic liquid selected from the class consisting of dimethylformamide, phenol and cyclohexanone.

9. Process for manufacture of the solid solutions according to claim 1 which comprises heating a neutral aqueous paste of the components under pressure at between 150° and 300° C.

References Cited by the Examiner

FOREIGN PATENTS 851,571  10/1960  Great Britain.

TOBIAS E. LEVOW, Primary Examiner.

HELEN M. McCARTHY, Examiner.

J. POER, Assistant Examiner.